United States Patent
Chang et al.

(10) Patent No.: US 9,076,052 B2
(45) Date of Patent: Jul. 7, 2015

(54) RADIO FREQUENCY IDENTIFICATION CONTROL SYSTEM

(71) Applicants: Hsin-Pei Chang, New Taipei (TW); Zong-Yuan Sun, New Taipei (TW); Da-Hua Xiao, Shenzhen (CN)

(72) Inventors: Hsin-Pei Chang, New Taipei (TW); Zong-Yuan Sun, New Taipei (TW); Da-Hua Xiao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 138 days.

(21) Appl. No.: 13/858,029

(22) Filed: Apr. 6, 2013

(65) Prior Publication Data

US 2013/0299580 A1 Nov. 14, 2013

(30) Foreign Application Priority Data

May 14, 2012 (CN) .......................... 2012 1 0147256

(51) Int. Cl.
*G06K 7/00* (2006.01)
*G06K 7/10* (2006.01)

(52) U.S. Cl.
CPC ........ *G06K 7/10198* (2013.01); *G06K 7/10475* (2013.01)

(58) Field of Classification Search
USPC ...................... 235/439, 451; 340/10.1, 10.33
See application file for complete search history.

(56) References Cited

U.S. PATENT DOCUMENTS

| 5,678,192 A * | 10/1997 | Paavonen et al. ............ 340/7.38 |
| 8,558,657 B2 * | 10/2013 | Moriya et al. ................. 340/3.2 |
| 2006/0251045 A1 * | 11/2006 | Okubo .......................... 370/350 |
| 2007/0080216 A1 * | 4/2007 | Ward et al. .................... 235/381 |
| 2009/0088077 A1 * | 4/2009 | Brown et al. ................ 455/41.2 |

* cited by examiner

*Primary Examiner* — Ahshik Kim
(74) *Attorney, Agent, or Firm* — Novak Druce Connolly Bove + Quigg LLP

(57) ABSTRACT

A fixed reader in communication with a portable reader includes an induction circuit and a microcontroller. The induction circuit receives wireless signals sent by the portable reader, and outputs control signals according to the received wireless signals. The microcontroller is electronically connected to the induction circuit, and activates the fixed reader according to the control signals, to allow the fixed reader to enter into a working state or an idle state.

11 Claims, 1 Drawing Sheet

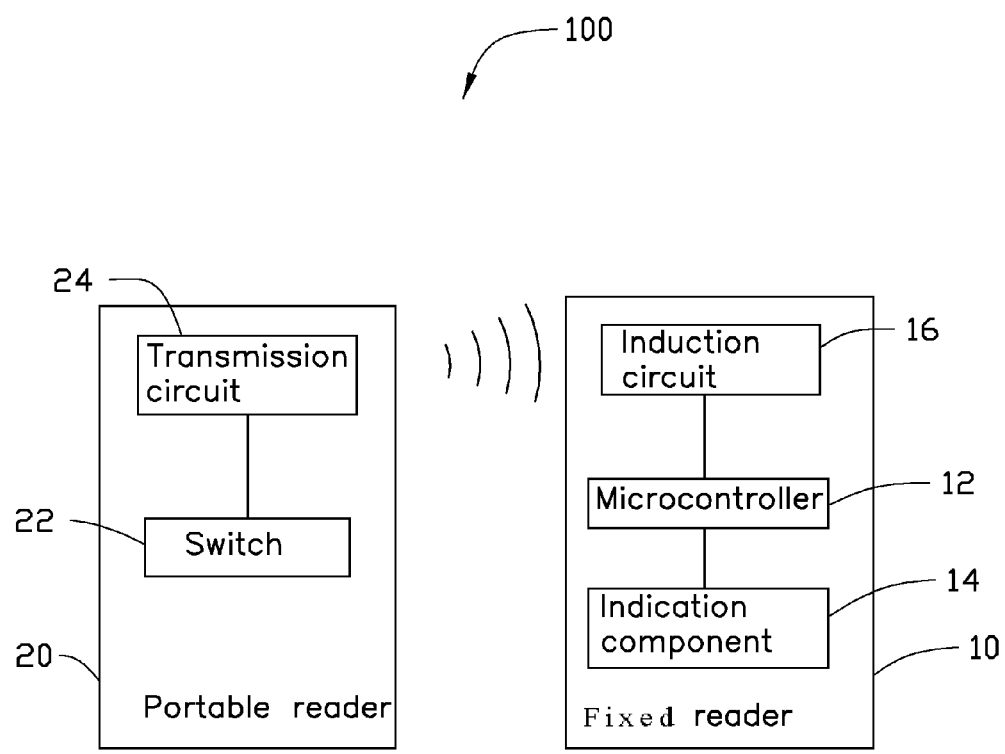

RADIO FREQUENCY IDENTIFICATION CONTROL SYSTEM

BACKGROUND

1. Technical Field

The disclosure generally relates to radio frequency identification (RFID) control systems, and particularly relates to readers used in a RFID control system.

2. Description of the Related Art

Searching and tracking of articles have evolved in transportation industry through the use of radio frequency identification (RFID) tags. When an article is stored in a warehouse, a fixed reader positioned on a door of the warehouse reads identification numbers of the RFID tags attached to the articles. Meanwhile, a manager of the warehouse can use a portable reader to search for the articles. However, the fixed reader and the portable reader may interfere with each other when the portable reader is near the fixed reader, and errors may occur in the readings.

Therefore, there is room for improvement within the art.

BRIEF DESCRIPTION OF THE DRAWINGS

Many aspects of the present disclosure can be better understood with reference to the drawing. The components in the drawings are not necessarily drawn to scale, the emphasis instead being placed upon clearly illustrating the principles of the present embodiments.

The FIGURE is a block diagram of a radio frequency identification (RFID) control system, according to an exemplary embodiment.

DETAILED DESCRIPTION

The FIGURE shows a radio frequency identification (RFID) control system 100 of one embodiment. The RFID control system 100 can be used in transportation industry, anti-counterfeiting, anti-theft, and other areas. In one exemplary embodiment, the RFID control system 100 is used in transportation industry for searching for articles stored in a warehouse. The articles can be clothes, computers, or confidential files, for example. Each article is allocated an RFID tag comprising an identification number. The identification number may correspond to an express serial number and a predetermined destination.

The RFID control system 100 includes a fixed reader 10 and a portable reader 20. Working frequencies of the fixed reader 10 and the portable reader 20 can be both about 902-928 MHz, for example, and reading/writing radius of the fixed reader 10 and the portable reader 20 can be both about 3 meters, for example.

The fixed reader 10 can be positioned at a door of the warehouse or other suitable locations, to read the identification numbers of the articles which are put in or taken out from the warehouse. The fixed reader 10 further writes other information in the tags of the articles, the other information can be real times such as times that the articles are put in or taken out from the warehouse, for example.

The fixed reader 10 includes a microcontroller 12, an indication component 14, and an induction circuit 16, where both the indication component 14 and the induction circuit 16 are electronically connected to the microcontroller 12. The induction circuit 16 receives wireless signals sent by the portable reader 20. When the induction circuit 16 receives wireless signals sent by the portable reader 20, the induction circuit 16 outputs a first control signal (e.g., logic "0") to the microcontroller 12. When the induction circuit 16 does not receive wireless signals sent by the portable reader 20, the induction circuit 16 outputs a second control signal (e.g., logic "1") to the microcontroller 12. The microcontroller 12 activates the fixed reader 10 according to the first control signal or the second control signal, to allow the fixed reader 10 to enter into a working state or an idle state. When the fixed reader 10 is in the working state, the fixed reader 10 can read/write the RFID tags of the articles. When the fixed reader 10 is in the idle state, the fixed reader 10 cannot read/write the RFID tags of the articles.

In addition, the microcontroller 12 sends a voltage signal to the indication component 14 to turn on/off the indication component 14. In one exemplary embodiment, the indication component 14 is a light-emitting diode (LED). When the fixed reader 10 is in the working state, the microcontroller 12 sends the voltage signal to turn on the indication component 14. When the fixed reader 10 is in the idle state, the microcontroller 12 does not send the voltage signal to the indication component 14, and then the indication component 14 is turned off.

The portable reader 20 is used to search for the articles stored in the warehouse. The portable reader 20 includes a switch 22 and a transmission circuit 24. The transmission circuit 24 is used to send wireless signals, and a radiation radius of the wireless signals is less than or equal to the reading/writing radius summation of the fixed reader 10 and the portable reader 20. In one exemplary embodiment, the working frequency of the transmission circuit 24 is 2.45 GHz, and the radiation radius of the wireless signals is about 6 meters. The switch 22 is electronically connected to the transmission circuit 24 to turn on/off the portable reader 20 and the transmission circuit 24. For example, when the switch 22 is pressed down or released (e.g., actuate), the portable reader 20 is turned on, and the transmission circuit 24 obtains power from the portable reader 20. Additionally, the transmission circuit 24 and the fixed reader 10 cannot interfere with each other because of the large difference between the working frequency of the fixed reader 10 and the working frequency of the transmission circuit 24.

To search for the articles using the portable reader 20, if a distance between the portable reader 20 and the fixed reader 10 is greater than the radiation radius of the transmission circuit 24, the interference between the fixed reader 10 and the portable reader 20 is negligible. Additionally, the induction circuit 16 cannot receive wireless signals sent by the portable reader 20 since the distance between the portable reader 20 and the fixed reader 10 is greater than the radiation radius of the transmission circuit 24, and then the induction circuit 16 outputs the second control signal (e.g., logic "1") to the microcontroller 12. The microcontroller 12 activates the fixed reader 10 to allow the fixed reader 10 to enter into the working state. Thus, the indication component 14 is turned on to represent that the articles can be put in the warehouse.

If the distance between the portable reader 20 and the fixed reader 10 is less than the radiation radius of the transmission circuit 24, the induction circuit 16 receives wireless signals sent by the portable reader 20, and then the induction circuit 16 outputs the first control signal (e.g., logic "0") to the microcontroller 12. The microcontroller 12 activates the fixed reader 10 to allow the fixed reader 10 to enter into the idle state. Thus, the indication component 14 is turned off to represent the articles cannot be put in the warehouse. Additionally, the portable reader 20 and the fixed reader 10 cannot interfere with each other since the fixed reader 10 is in the idle state. Thus, reading errors can be avoided.

In other exemplary embodiments, If the distance between the portable reader 20 and the fixed reader 10 is less than the reading/writing radius summation of the fixed reader 10 and the portable reader 20, the portable reader 20 can be turned off by actuating the switch 22. Thus, no interference with the fixed reader 10 occurs In summary, the induction circuit 16 can induct the wireless signals sent by the transmission circuit 24, and accordingly control the fixed reader 10. Thus, when the portable reader 20 is close to the fixed reader 10, the induction circuit 16 receives wireless signals sent by the transmission circuit 24, and outputs the control signals to allow the fixed reader 10 to enter into the idle state. Thus, the fixed reader 10 and the portable reader 30 do not interfere with each other, and reading/writing errors can be avoided.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of the exemplary disclosure to the full extent indicated by the broad general meaning of the terms in which the appended claims are expressed.

What is claimed is:

1. A fixed reader in communication with a portable reader, the fixed reader comprising:
   an induction circuit receiving wireless signals sent by the portable reader, and outputting control signals according to the received wireless signals; and
   a microcontroller electronically connected to the induction circuit, and activating the fixed reader according to the control signals, to allow the fixed reader to enter into a working state or an idle state;
   wherein the portable reader predetermines a radiation radius, and if a distance between the portable reader and the fixed reader is less than the radiation radius, the induction circuit receives wireless signals sent by the portable reader and outputs a first control signal to the microcontroller; and
   wherein the microcontroller controls the fixed reader to enter into the work state according to the first control signal.

2. The fixed reader as claimed in claim 1, wherein if a distance between the portable reader and the fixed reader is greater than the radiation radius, the induction circuit does not receive wireless signals sent by the portable reader, and output a second control signal to the microcontroller, the microcontroller controls the fixed reader to enter into the idle state according to the second control signal.

3. The fixed reader as claimed in claim 1, further comprising an indication component electronically connected to the microcontroller, wherein if the fixed reader is in the working state, the microcontroller sends a voltage signal to turn on the indication component, if the fixed reader is in the idle state, the microcontroller dose not send the voltage signal to turn off the indication component.

4. The fixed reader as claimed in claim 3, wherein the indication component is a light-emitting diode (LED).

5. A radio frequency identification (RFID) control system, comprising:
   a portable reader sending wireless signals;
   a fixed reader in communication with the portable reader, the fixed reader comprising:
      an induction circuit receiving the wireless signals sent by the portable reader, and outputting control signals according to the received wireless signals;
   a microcontroller electronically connected to the induction circuit, and activating the fixed reader according to the control signals, to allow the fixed reader to enter into a working state or an idle state;
   wherein the portable reader predetermines a radiation radius, and if a distance between the portable reader and the fixed reader is less than the radiation radius, the induction circuit receives wireless signals sent by the portable reader and outputs a first control signal to the microcontroller; and
   wherein the microcontroller controls the fixed reader to enter into the work state according to the first control signal.

6. The RFID control system as claimed in claim 5, wherein if a distance between the portable reader and the fixed reader is greater than the radiation radius, the induction circuit does not receive wireless signals sent by the portable reader, and outputs a second control signal to the microcontroller, the microcontroller controls the fixed reader to enter into the idle state according to the second control signal.

7. The RFID control system as claimed in claim 5, wherein both of the portable reader and the fixed reader predetermine a reading/writing radius, and the radiation radius of the wireless signals is less than or equal to the reading/writing radius summation of the fixed reader and the portable reader.

8. The RFID control system as claimed in claim 5, wherein the portable reader further includes a transmission circuit to send the wireless signals.

9. The RFID control system as claimed in claim 8, wherein the portable reader further comprises a switch that is electronically connected to the transmission circuit to turn on/off the portable reader and the transmission circuit.

10. The RFID control system as claimed in claim 5, wherein the fixed reader further comprises an indication component that is electronically connected to the microcontroller, if the fixed reader is in the working state, the microcontroller sends a voltage signal to turn on the indication component, if the fixed reader is in the idle state, the microcontroller dose not send the voltage signal to turn off the indication component.

11. The RFID control system as claimed in claim 10, wherein the indication component is a light-emitting diode (LED).

* * * * *